US008752385B2

(12) United States Patent
Kaneeda et al.

(10) Patent No.: US 8,752,385 B2
(45) Date of Patent: Jun. 17, 2014

(54) HEAT RECOVERY SYSTEM OF THE BOILER WITH $CO_2$ CAPTURE SYSTEM

(75) Inventors: Masato Kaneeda, Hitachinaka (JP); Hiroki Sato, Hitachinaka (JP); Kohei Yoshikawa, Hitachi (JP); Shuichi Kanno, Hitachinaka (JP); Hisayuki Orita, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/590,764

(22) Filed: Aug. 21, 2012

(65) Prior Publication Data

US 2013/0062883 A1     Mar. 14, 2013

(30) Foreign Application Priority Data

Sep. 12, 2011 (JP) ................................. 2011-197834

(51) Int. Cl.
| | |
|---|---|
| *F01K 23/06* | (2006.01) |
| *B01D 53/14* | (2006.01) |
| *C01B 31/20* | (2006.01) |
| *F23L 15/00* | (2006.01) |

(52) U.S. Cl.
USPC ............... 60/670; 60/691; 423/220; 423/230; 110/303

(58) Field of Classification Search
USPC ........... 60/697, 645, 670, 686, 653, 677–680, 60/646, 657, 648, 685; 95/183; 700/274; 423/220, 230, 437.1; 110/188, 190, 110/205, 234, 345, 303; 431/12, 76
See application file for complete search history.

(56) References Cited

U.S. PATENT DOCUMENTS

| | | | |
|---|---|---|---|
| 5,344,627 A * | 9/1994 | Fujii et al. ...................... 423/220 |
| 5,724,805 A * | 3/1998 | Golomb et al. .................. 60/783 |
| 5,904,908 A | 5/1999 | Suzuki et al. |
| 8,114,808 B2 * | 2/2012 | Smirniotis et al. ............ 502/400 |
| 2010/0258005 A1 * | 10/2010 | Oishi et al. ...................... 95/156 |

FOREIGN PATENT DOCUMENTS

EP     0 945 162 A1    9/1999

(Continued)

OTHER PUBLICATIONS

Siriwardane et al (CO2 Capture and Separation—Capture Technologies Session. Siriwardane, Ranjani. Fifth Annual Conference on Carbon Capture and Sequestration, 2006).*

(Continued)

*Primary Examiner* — Thomas Denion
*Assistant Examiner* — Laert Dounis
(74) *Attorney, Agent, or Firm* — Crowell & Moring LLP

(57) ABSTRACT

A boiler system including an electric power generation system having a boiler, a steam turbine for generating electric power by steams which received heat at a boiler, a condenser provided at the downstream thereof for condensing the steams, and a heater for heating condensed water by steams extracted from the steam turbine and, further, a $CO_2$ capture system of sorbing and capturing a $CO_2$ gas in an exhausted gas exhausted from the boiler by using a solid $CO_2$ sorbent, and a chimney of exhausting an exhaust gas in the $CO_2$ capture system after recovery of $CO_2$ or an exhaust gas exhausted from the boiler, in which the temperature of a fluid concerned with the boiler system is increased by using the exhaust gas exhausted from the $CO_2$ capture system.

9 Claims, 5 Drawing Sheets

(56) References Cited

FOREIGN PATENT DOCUMENTS

| | | | |
|---|---|---|---|
| JP | 60-227845 A | | 11/1985 |
| JP | 3-193116 A | | 8/1991 |
| JP | 03193116 A | * | 8/1991 |
| JP | 06050526 A | * | 2/1994 |
| JP | 07079950 B | * | 8/1995 |
| JP | 3486220 B2 | * | 1/2004 |
| JP | 2005-161220 A | | 6/2005 |
| JP | 3761960 B2 | | 3/2006 |
| JP | 3771708 B2 | | 4/2006 |
| JP | 2010-240617 A | | 10/2010 |
| WO | WO 2011096250 A1 | * | 8/2011 |

OTHER PUBLICATIONS

English language translation of JP 07-079950 B (1995).*

"Operation Results of IHI Flue Gas Desulfurization System", Unit No. 1, (1 000 MW) of Hitachinaka Thermal Power Station for Tokyo Electric Power Co., Inc., vol. 45, No. 1 (2005), pp. 30-35.

NEDO Report, Hei 14, (2002), "Development for Effictive Utilization of Technique of Fixing Carbon Dioxide for Practical Use, and Development for CO2 Separating and Capturing Technique by Chemical Adsorption", Shikoku Research Institute, (2003), (twenty (20 pages).

"CO2 Seperation/capture and Store/Isolation Technique", Published from NTS, (2009) vol. 76, (six (6) pages).

\* cited by examiner

PRIOR ART

PRIOR ART

HEAT RECOVERY SYSTEM OF THE BOILER WITH $CO_2$ CAPTURE SYSTEM

PRIORITY STATEMENT

The present application hereby claims priority under 35 U.S.C. §119 on Japanese patent application number JP 2011-197834 filed Sep. 12, 2011, the entire contents of which is hereby incorporated herein by reference.

BACKGROUND

The present invention concerns a heat recovery system of a boiler with a $CO_2$ capture system.

In recent years, reduction of $CO_2$ emission has been demanded world wide for suppressing global warming. Particularly, exhaust gases discharged from equipment such as coal-fired boilers, gas turbines, and chemical plants contain $CO_2$ as much as several % or more and a method of separating and capturing $CO_2$ has been demanded.

An exhaust gas processing system of a coal-fired boiler includes an $NO_x$ reduction system provided downstream of a boiler for reduction and detoxification of nitrogen oxides (hereinafter referred to as $NO_x$), an air heater provided downstream thereof for cooling an exhaust gas using air as a coolant, a heat exchanger provided downstream thereof for cooling the exhaust gas using water as a coolant, a dust removal system provided downstream thereof for removing dusts and soots in the exhaust gas, a desulfurization system provided downstream thereof for absorption and detoxification of sulfur oxide (hereinafter referred to as $SO_x$), and a heat exchanger provided downstream thereof for warming the exhaust gas (for example, refer to IHI Technical Report Vol. 45, No. 1 (2005-3) (hereinafter referred to as Non-Patent Document 1). Water heated by the heat exchanger downstream of the air heater is utilized as a heat source for the heat exchanger provided downstream of the desulfurization system. Hereinafter, the former heat exchanger is referred to as a heat recovery heat exchanger and the latter heat exchanger is referred to as a re-heating heat exchanger. The re-heating heat exchanger is provided for preventing steams discharged out of a chimney from forming white smoke that results in visual pollution. In a place where such regulation is imposed, installation of the re-heating heat exchanger is legally obliged.

Further, $CO_2$ in the exhaust gas can be separated and captured by providing a $CO_2$ capture system downstream of a desulfurization system. As a method of separating and capturing $CO_2$ in the exhaust gas, a method of absorbing $CO_2$ in a $CO_2$ adsorbing column by using an amine solution including MEA (monoethanol amine), etc. which is applied to separation and capture of $CO_2$ in the exhaust gas from a boiler or a gas turbine. For improving a $CO_2$ capturing efficiency, various amine compounds have been proposed (for example, refer to Japanese Patent Publications Nos. 3761960 and 3771708). The amine compound has a high ability of separating and capturing $CO_2$. However, since the amine compound is poisoned by oxygen or $SO_x$, etc. in the exhaust gas or scatters partially from the $CO_2$ absorption column, supplementation of the amine compound is necessary to increase the cost.

Then, a $CO_2$ capture system using a $CO_2$ solid sorbent which is less poisoned by oxygen, $SO_x$, etc. in the exhaust gas and less scatters has been studied. For example, a system of having four columns packed with a $CO_2$ solid sorbent and capturing $CO_2$ by four steps of (1) sorbing $CO_2$ by a sorbent, (2) purging the inside of the column, (3) desorbing $CO_2$ from the sorbent, and (4) cooling the sorbent is disclosed in NEDO Report, Hei 14 (2002), Development for Effective Utilization of Technique of Fixing Carbon Dioxide for Practical Use, and Development for $CO_2$ Separating and Capturing Technique by Chemical Adsorption, by Shikoku Research Institute (2003-3) (hereinafter referred to as Non-Patent Document 2).

Further, a technique capable of downsizing the system by constructing a rotational driving type $CO_2$ capture system using a $CO_2$ solid sorbent is described in "$CO_2$ Separation/capture and Store/Isolation Technique", published from NTS (2009) 76 (hereinafter referred to as Non-Patent Document 3).

On the other hand, for the heat efficiency of a boiler, a heat efficiency of an electric power generation system is improved generally by re-heating a condensate generated from a condenser provided downstream of a steam turbine by steams extracted from the steam turbine.

In a case where the re-heating exchanger is not present, heat recovered by the heat recovery heat exchanger can be utilized in other uses. For example, Japanese Unexamined Patent Application Publication No. S60 (1985)-227845 describes a method of heating a condensate by using heat recovered from a boiler exhaust gas by a heat recovery heat exchanger thereby improving the heat efficiency of the boiler (refer to FIG. 5).

Further, Japanese Patent Unexamined Application Publications Nos. H03 (1991)-193116 and 2010-240617 describe that the heat efficiency of a boiler is improved by heating a condensate utilizing the heat of captured $CO_2$ which is generated from a $CO_2$ capture system using an amine solution.

SUMMARY

When $CO_2$ is recovered by using a $CO_2$ solid sorbent, heat is generated upon sorption (absorption heat and adsorption heat) and, further, air, etc. possessing some heat are generated upon cooling of the sorbent. In the $CO_2$ capture system shown in the Non-Patent Documents 2, 3, such heat energy cannot be re-utilized sufficiently, which may lower the heat efficiency of the boiler due to the energy used for capturing $CO_2$. Japanese Patent Publications Nos. 3761960 and 3771708 do not describe a method for coping with the lowering of the heat efficiency of the boiler. The method shown in Japanese Unexamined Patent Application Publication No. S60 (1985)-227845 does not describe the effective utilization of heat generated from the $CO_2$ capture system and improvement in the heat efficiency is insufficient. Further, since the re-heating heat exchanger is not used, this results in a disadvantage of generating white smoke from a chimney. Japanese Unexamined Patent Application Publication Nos. H03 (1991)-193116 and 2010-240617 only show the technique of utilizing heat of the $CO_2$ gas emitted from the amine solution and do not show an optimal heat recovery method in a case of using the $CO_2$ solid sorbent and improvement in the heat efficiency of the boiler is insufficient.

The present invention intends to improve the heat efficiency of a boiler that separates and captures $CO_2$ from an exhaust gas using a $CO_2$ solid sorbent and, specifically, it intends to provide a heat recovery system and a heat recovery method capable of efficiently recovering the heat energy generated from a system for capturing $CO_2$, and a $CO_2$ sorbent used therefor.

A heat recovery system of a boiler according to the invention has a $CO_2$ capture system of capturing $CO_2$ contained in an exhaust gas by using a $CO_2$ solid sorbent and increases the temperature of a fluid concerned with the boiler by using a gas generated from the $CO_2$ capture system.

According to the invention, the heat efficiency of the boiler can be improved remarkably by efficiently recovering the heat generated from the $CO_2$ capture system. Further, it can prevent generation of white smokes from a chimney while suppressing lowering of the heat efficiency.

DETAILED DESCRIPTION

Figure 1:
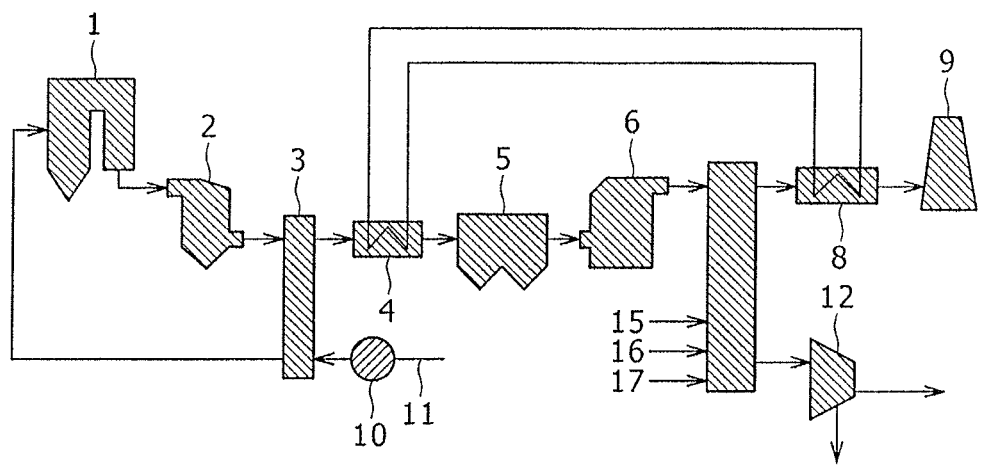
FIG. 1 is a view showing an embodiment of an existent boiler exhaust gas purifying system.

The present invention is to be described specifically.

Generally, for improving the heat efficiency of a boiler, a steam turbine that generates electric power by steams which received heat at a boiler and a condenser for condensing the steams at the downstream thereof are provided, and a condensate obtained by condensation is heated by steams extracted from the steam turbine, thereby improving the heat efficiency of the electric power generation system. Further, in Japanese Unexamined Patent Application Publication No. S60 (1985)-227845, the heat efficiency of the power generation system is further improved by heating water condensed by the condenser using the heat of a boiler exhaust gas by passing through a heat exchanger. However, since the heat of the boiler exhaust gas is used for increasing the temperature of the condensate, the temperature of the exhaust gas at the upstream of a chimney cannot be increased, which may possibly lead to generation of the white smoke.

The present inventors have made an earnest study and, as a result, have found that white smoke generated from a chimney can be suppressed while also improving the heat efficiency of an electric power generation system in a boiler system comprising a power generation system having a boiler, a steam turbine that generates electric power by steams which received heat at a boiler, a condenser provided at the downstream thereof for condensing the steams, a heater for heating the condensed water with steams extracted from the steam turbine and, further, a $CO_2$ capture system for sorbing and capturing a $CO_2$ gas in an exhaust gas exhausted from the boiler by a solid $CO_2$ sorbent, and a chimney for discharging the exhaust gas after capturing $CO_2$ by the $CO_2$ capture system, or an exhaust gas exhausted from the boiler, in which the temperature of a fluid concerned with the boiler system is increased by using the exhaust gas exhausted from the $CO_2$ capture system.

The boiler as a target of the invention is not particularly restricted so long as a heat recovering steam turbine is provided. The invention is applicable to a system including a gas-fired boiler, a coal-fired boiler, or a gas turbine as the boiler, as well as to IGCC (integrated coal gasification combined cycle).

As the fluid concerned with the boiler system, water condensed by the condenser, a gas flowing into the boiler, and an exhaust gas exhausted from the boiler may be considered.

(Increase of Temperature of Condensate)

The heat efficiency of the electric power generation system can be improved by partially or entirely heat-exchanging water condensed by the condenser with the exhaust gas exhausted from the $CO_2$ capture system by using a heat exchanger and increasing the temperature thereof. In the invention, a solid $CO_2$ sorbent is used as the $CO_2$ capture system. In this case, the temperature of the exhaust gas exhausted from the $CO_2$ capture system may sometimes reach 100° C. to 500° C. depending on the type of the $CO_2$ sorbent. Japanese Unexamined Patent Application Publication No. H03 (1991)-193116 describes that the turbine output is improved by 0.3% to 0.4% based on a trial calculation in a case of a $CO_2$ exhaust temperature at 85° C. When a solid $CO_2$ sorbent is used, a further improvement can be expected in the turbine output.

Further, in this case, white smoke can be prevented, for example, by recovering the heat of the boiler exhaust gas at the downstream of the air heater by the heat recovery heat exchanger and increasing the temperature of the exhaust gas at the upstream of the chimney by using the re-heating heat exchanger.

(Increase of Temperature of Gas Flowing into Boiler)

The heat efficiency of the boiler is improved by increasing the temperature of a gas flowing into the boiler by using the exhaust gas exhausted from the $CO_2$ capture system. In the existent technique, air at about room temperature is heated to about 300° C. by using an air heater and then caused to flow into the boiler. However, when the temperature of air is increased to about 100° C. by using the exhaust gas exhausted from the $CO_2$ capture system, the temperature of the air flowing into the boiler after passing through the air heater can also be increased to about 350° C. In this case, since the temperature of the boiler exhaust gas is increased by about 50° C., when a heat recovery heat exchanger is provided to the downstream of the air heater and the temperature of water condensed by the condenser can be increased partially or entirely more effectively by using the heat exchanger, and the heat efficiency of the electric power generation system is improved. In this case, the electric power generation efficiency of the boiler is improved by about 2.1%.

Further, in this case, white smoke can be prevented effectively by partially or entirely using the heat recovered by the heat recovery heat exchanger for increasing the temperature of the exhaust gas at the upstream of the chimney by using a re-heating heat exchanger.

Means for increasing the temperature of the gas flowing into the boiler by using the exhaust gas exhausted from the $CO_2$ capture system is not particularly restricted. For example, the exhaust gas exhausted from the $CO_2$ capture system and a gas including air can be heat-exchanged by using a heat exchanger. Species of a gas generated from the $CO_2$ capture system include, for example, $N_2$, $O_2$, $CO_2$, $H_2O$, air, etc. In this case, there is a merit that the gas can be used irrespective of the species.

Alternatively, the exhaust gas exhausted from the $CO_2$ capture system can be used partially or entirely as a gas flowing into the boiler. The exhaust gas generated from the $CO_2$ capture system may sometimes contain $CO_2$, which may lower the $CO_2$ recovery efficiency if the gas is released to atmospheric air. By letting the exhaust gas generated from the $CO_2$ capture system partially or entirely flow into the boiler, $CO_2$ is again taken into the boiler and flows through the exhaust gas purification system into the $CO_2$ capture system to improve the $CO_2$ capturing efficiency.

(Increase of Temperature of Boiler Exhaust Gas)

Generation of white smoke from the chimney can be suppressed by increasing the temperature of a gas flowing into the chimney by using the exhaust gas exhausted from the $CO_2$ capture system. Specifically, the temperature of the gas flowing into the chimney can be increased when the gas flowing into the chimney partially or entirely comprises the exhaust gas exhausted from the $CO_2$ capture system.

Alternatively, the temperature of the gas flowing into the chimney can be increased by providing a heat exchanger for increasing the temperature of a gas flowing into the chimney and performing heat exchange with the exhaust gas exhausted from the $CO_2$ capture system. When the exhaust gas generated from the $CO_2$ capture system contains $CO_2$ and flows as it is into the chimney, once captured $CO_2$ is emitted into atmospheric air. In a case of using the heat exchanger, since the $CO_2$ gas after heat exchange can be captured by flowing $CO_2$ after heat exchange into a compressor, such disadvantage can be overcome.

($CO_2$ Capture System)

The $CO_2$ capture system is not particularly restricted providing that the system utilizes the $CO_2$ sorbing effect of the solid $CO_2$ sorbent. As the $CO_2$ capture system, it may be considered to provide four $CO_2$ sorbing columns packed with a $CO_2$ sorbent. In this case, as the $CO_2$ capturing process, (a) $CO_2$ sorbing step, (b) purging step for the inside of the $CO_2$ sorption column, (c) desorbing step of $CO_2$ and (d) cooling step for the inside of the $CO_2$ sorption column may be considered and $CO_2$ in the exhaust gas can be captured at a high level by corresponding the following four steps (a) to (d) successively to each of the four $CO_2$ sorption columns.

(a) $CO_2$ sorption: $CO_2$ gas in the exhaust gas is sorbed by letting an exhaust gas flow into the $CO_2$ sorption column.

(b) Purging for the inside of $CO_2$ sorption column: After sorbing $CO_2$, inside of the $CO_2$ sorption column is purged by flowing a gas into the $CO_2$ sorption column. As a purge gas, a $CO_2$ gas at a high purity is used preferably for increasing the concentration of captured $CO_2$.

(c) $CO_2$ desorption: Then, a gas is caused to flow for desorbing $CO_2$ from the sorbent and the desorbed $CO_2$ gas is captured. For desorbing $CO_2$ from the sorbent, it is necessary to heat the sorbent. The quantity of heat to be applied is different depending on the sorbent. It is necessary to increase the temperature of the sorbent to a temperature at which $CO_2$ is desorbed from the sorbent. As a method of applying the heat, it may be considered, for example, to extract steams generated in the steam turbine and cause the steams to flow through the $CO_2$ sorption column. Further, a method of obtaining heat from other $CO_2$ sorption column by way of a heat exchanger may also be considered.

(d) Cooling for the inside of the $CO_2$ sorption column: Further, it is necessary to lower the temperature of the sorption column once increased in the $CO_2$ desorption step described above to a temperature suitable to the $CO_2$ sorbing step. As a method of lowering the temperature, it may be considered to flow a gas at a temperature lower than that of the sorption column. Use of atmospheric air at room temperature may be considered as an example. Further, (b) when the $CO_2$ gas is used for purging in the purging step for the inside of the $CO_2$ sorption column, $CO_2$ may sometimes flow out of the $CO_2$ sorption column. In this case, the gas flowing out of the $CO_2$ sorption column can also be used as a gas for lowering the temperature of the $CO_2$ sorption column by letting the gas flow into the $CO_2$ sorption column during the cooling step (d) in the $CO_2$ sorption column. By using the method, $CO_2$ once flowing out in the purging step can be caused to flow again into the sorption column to improve the $CO_2$ recovery efficiency. Japanese Unexamined Patent Application Publication Nos. H03 (1991)-193116 and 2010-240617 disclose a technique of recovering the heat of the $CO_2$ gas desorbed from the amine solution, but any gas generated from the $CO_2$ sorption column at the steps (a) to (d) can be used when the solid $CO_2$ sorbent is used.

The gas flowing out of the $CO_2$ sorption column may include, for example, $N_2$, $O_2$, $CO_2$, steams, air, etc. Since the flowing out gas has a sorption heat in the sorption column (adsorption heat, absorption heat, heat transferred from the sorbent), etc. the gas reaches a temperature at about 50° C. to 500° C. By recovering the heat of the flowing out gas by the technique shown in the present specification, the heat efficiency of the electric power generation system can be improved.

The $CO_2$ sorbing material is not particularly restricted so long as the sorbent comprises a material capable of sorbing $CO_2$ and preferred ingredient includes, for example, Ce, Pr, Nd, Sm, Gd, etc. The $CO_2$ recovery efficiency is improved particularly by the use of Ce. The chemical form of the ingredient is not particularly restricted. The chemical form of the ingredient may include, for example, metal, oxide, organic compound, and chloride, and the oxide form is particularly preferred. The oxide suffers from less degradation due to the use and can be used for a long time.

The structural form of the $CO_2$ sorbent includes, for example, that of granule, lump, sphere, pellet, honeycomb, mesh, etc. and the structural form can be selected in accordance with the operation state of the $CO_2$ capture system, to which the sorbent is applied.

The $CO_2$ sorbent preferably has a specific surface area of 3 $m^2/g$ or more. When the specific surface area is small, the $CO_2$ capturing performance is decreased and the provision of the system gives less effect.

The ingredient may be supported, for example, on a porous support such as alumina or zeolite. The ingredient can be dispersed highly and the $CO_2$ sorbing performance can be improved further by supporting the ingredient on the porous support having a specific surface area of 10 $m^2/g$ or more.

As the preparation method of the $CO_2$ sorbent, physical preparation method, for example, an impregnation method, a kneading method, a coprecipitation method, a sol-gel method, an ion exchange method, a vapor deposition method, a spray dry method, etc., and preparation methods utilizing the chemical reaction can be used.

As the starting material for the $CO_2$ sorbent, various compounds, for example, nitrate compounds, chlorides, acetate compounds, complex compounds, hydroxides, carbonate compounds, and organic compounds, as well as metals, or metal oxides can be used.

Preferred embodiments of the invention are to be described with reference to the drawings.

(Example of Existent Exhaust Gas Purifying System)

FIG. 1 shows an example of an exhaust gas processing system for a coal-fired boiler having a $CO_2$ capture system using a $CO_2$ solid sorbent. Coal and air are supplied to a coal-fired boiler 1, and the coal is burnt. The temperature of a combustion exhaust gas reaches 1600 to 1800° C. The temperature of the exhaust gas is lowered by a not-illustrated heat exchanger in the boiler and then introduced into an $NO_x$ reduction system 2. In the $NO_x$ reduction system, ammonia (hereinafter referred to as $NH_3$) is supplied to reduce and detoxify $NO_x$ into nitrogen (hereinafter referred to as $N_2$) by using a $NO_x$ reduction catalyst. Further, the exhaust gas is introduced into an air heater 3 and heat-exchanged with air 11

(boiler combustion gas). Air 11 is supplied from atmosphere air by a gas supply blower 10 (hereinafter referred to as FDF), heated by the air heater 3 and used as a combustion air in the coal-fired boiler 1. The exhaust gas introduced into a heat recovery heat exchanger (hereinafter referred to as a heat recovery GGH4) is heat-exchanged with water in the heat recovery GGH4, then removed with dusts and soots by a dust removal system 5, and removed with $SO_x$ in a desulfurization device 6. On the other hand, the temperature of the exhaust gas is increased by the reheating exchanger (hereinafter referred to as a reheating GGH8) by using water warmed by the heat recovery GGH4, and the exhaust gas is released from a chimney 9 at such a temperature that steams do not form white smoke. The re-heating heat exchanger is provided for preventing visual pollution caused by white smoke. If white smoke comprises steams, there is no environmental problem and installation thereof may not be legally obliged depending on the location.

Comparative Embodiment

Figure 2:
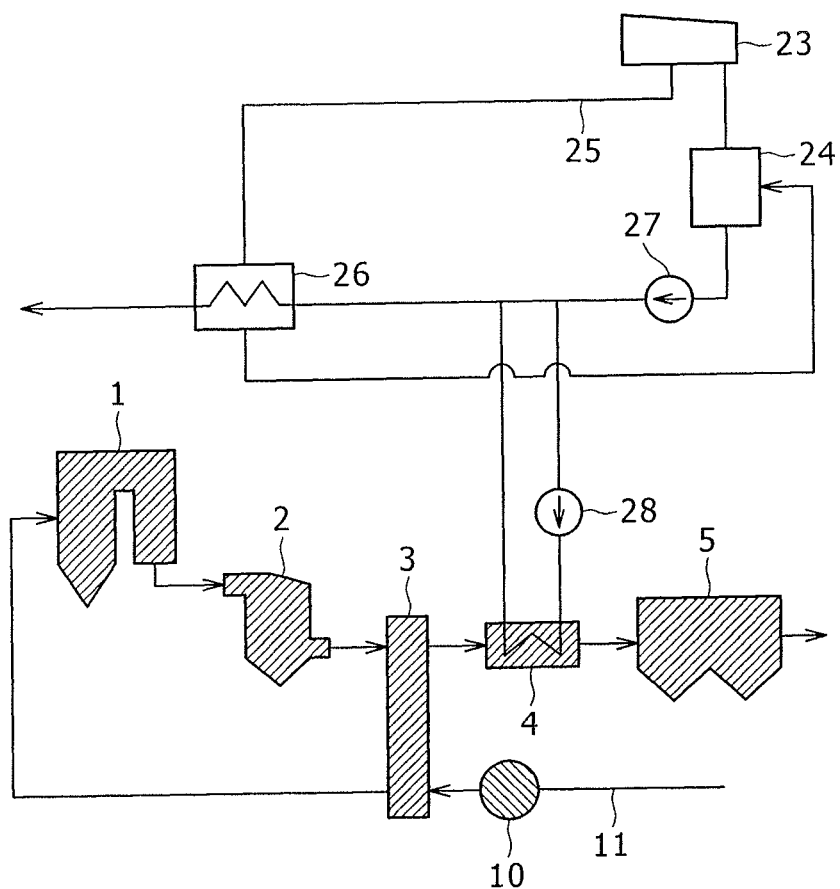
FIG. 2 is a view showing a system for improving the heat efficiency of a boiler by an existent method.

As a method of improving the heat efficiency by proceeding heat recovery in the exhaust gas processing of a coal-fired boiler, a technique as shown in FIG. 2 is considered. This technique concerns an exhaust gas processing system not providing a re-heating heat exchanger and this is a system of improving the heat efficiency of the boiler by utilizing heat recovered by a heat recovery GGH4.

A steam turbine 23 is driven by heat-recovered steams of a coal-fired boiler 1, and steams at the exit are cooled and condensed by a condenser 24. The formed condensate is sent to a heater 26 and heated by steams 25 extracted from the steam turbine 23. The heated condensate is sent to the boiler 1 to drive the steam turbine 23 again as a circulating cycle.

As shown in FIG. 2, a system of partially or entirely passing a condensate generated from the condenser 24 through the heat recovery GGH4 to increase the temperature of the condensate thereby improving the efficiency of the heat recovery has been considered as the existent technique. However, although this method improves the heat efficiency, a disadvantage not capable of preventing generation of white smoke from the chimney occurs since the re-heating exchanger is not present. Further, heat generated from the $CO_2$ capture system cannot be utilized.

First Embodiment

Example of $CO_2$ Capture System

Figure 3:
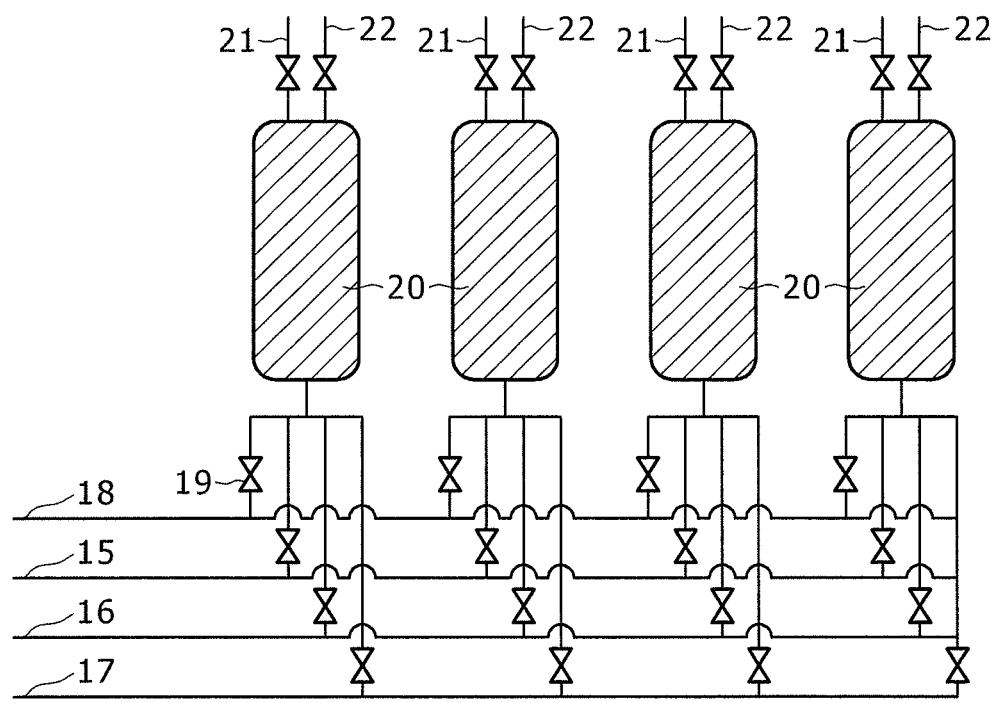
FIG. 3 is a view showing a $CO_2$ capture system using a $CO_2$ sorbent.

As a $CO_2$ capture system that can be used in the technique of the invention, a system shown in FIG. 3 may be considered.

$CO_2$ sorbent packed columns 20 as containers for incorporating a $CO_2$ sorbent shown by four units in FIG. 3 each have an identical function. Each of the four units of the $CO_2$ sorbent packed columns 20 incorporating the $CO_2$ sorbent continuously repeats four steps, that is, a $CO_2$ sorbing step, a $CO_2$ purging step, a $CO_2$ desorbing step, and a column cooling step successively.

At the first step ($CO_2$ sorbing step), a $CO_2$-containing gas which is an exhaust gas flowing from a channel 18 for $CO_2$-containing gas is caused to flow only to one of the four units of the $CO_2$ sorbent packed columns 20 incorporating the $CO_2$ sorbent, and $CO_2$ is sorbed by the $CO_2$ sorbent. The gas after removing $CO_2$ is exhausted from a gas exhaust port 21 or a pipeline 22 connected with a $CO_2$ compressor to the outside of the column. After it is judged that $CO_2$ sorption by the $CO_2$ sorbent reaches saturation, flow of the $CO_2$-containing gas from the channel 18 for $CO_2$-containing gas to the $CO_2$ sorbent packed column 20 incorporating the $CO_2$ sorbent is stopped.

At the second step ($CO_2$ purging step), $CO_2$ is caused to flow from a channel 15 for high purity $CO_2$ gas into the $CO_2$ sorbent packed column 20 to purge gases other than $CO_2$. The gases discharged in this step are exhausted from the gas exhaust port 21 or the pipeline 12 connected with the $CO_2$ compressor to the outside of the column. Finally, flow of the $CO_2$-containing gas is stopped.

At the third step ($CO_2$ desorbing step), the temperature of the $CO_2$ sorbent packed column 20 is increased and steams are caused to flow from a steam gas channel 16, by which $CO_2$ sorbed in the $CO_2$ sorbent is desorbed and exhausted from the gas exhaust port 21 or the pipeline 22 connected with the $CO_2$ compressor to the outside of the column.

At the fourth step (column cooling step), air at room temperature is caused to flow from an air channel 17 to the $CO_2$ sorbent packed column 20, by which the $CO_2$ sorbent and the $CO_2$ sorbent packed column 20 incorporating the $CO_2$ sorbent are cooled.

By repeating the four steps described above in each of the four units of containers incorporating the $CO_2$ sorbent, the operation of the system of capturing $CO_2$ continuously from the $CO_2$-containing gas can be attained.

It is considered that the gas exhausted at each of the steps is at a temperature of about 40° C. to 500° C., depending on the species and the temperature of the gas flowing into the $CO_2$ sorbent packed column 20 incorporating the $CO_2$ sorbent and, further, the type of the $CO_2$ sorbent.

(Example of System to Increase the Temperature of Condensate)

Figure 4:
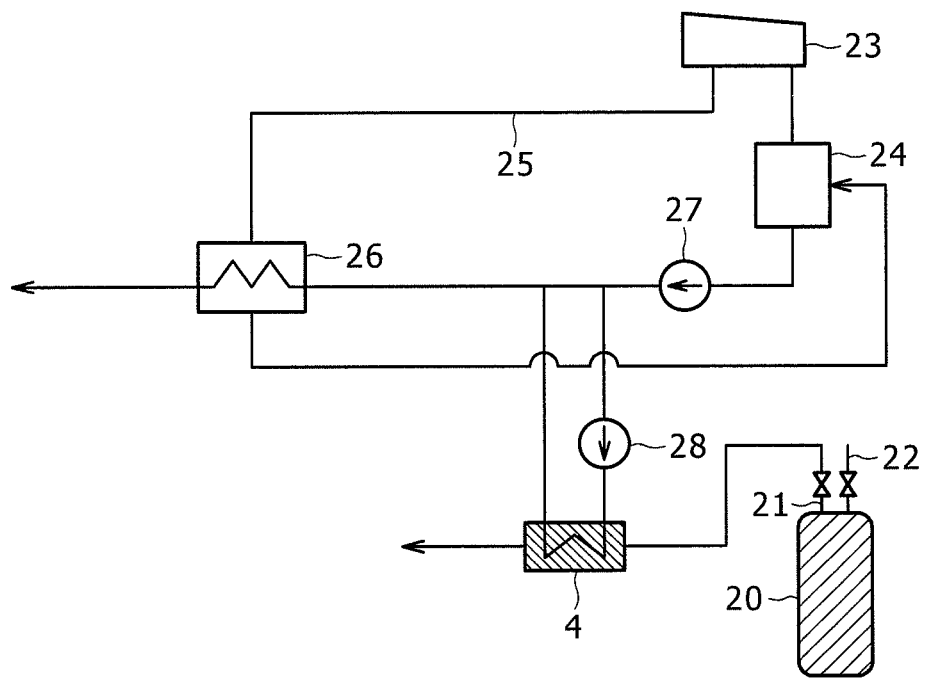
FIG. 4 is a view showing a system for increasing the temperature of a condensate by using an exhaust gas from a $CO_2$ capture system.

FIG. 4 is a view showing an example of a system for increasing the temperature of a condensate through heat exchange between a condensate obtained by condensation in a condenser 24, and a gas exhausted from a $CO_2$ sorbent packed column 20 which as the container for incorporating a $CO_2$ sorbent. As a gas flowing into a heat recovery GGH4, a gas discharged from the $CO_2$ sorbent packed column 20 for incorporating the $CO_2$ sorbent at any of the $CO_2$ capturing step, the $CO_2$ purging step, $CO_2$ desorbing step, and the column cooling step may be used. However, a $CO_2$ gas exhausted from the $CO_2$ sorbent packed column 20 for incorporating the $CO_2$ sorbent in the $CO_2$ desorbing step is passed through the heat recovery GGH4, compressed by a compressor, and then recovered. The condensate whose temperature is increased by the heat recovery GGH4 is passed through a heater 26 and then sent to the boiler 1 thereby contributing to the improvement of the power of the electric power generation system. Improvement of 0.4% or more can be expected for the turbine output depending on the capacity of the boiler.

In addition, when the system shown in FIG. 1 is combined, and the heat recovery GGH4 and the re-heating GGH8 are used together, generation of white smoke from the chimney can also be suppressed.

With the result described above, as shown in this embodiment, the boiler output can be improved and the generation of the white smoke from the chimney can be suppressed simultaneously in the system of increasing the temperature of a fluid concerned with the boiler system by using the exhaust gas exhausted from the $CO_2$ capture system, by adapting the system, for example, as the heat recovery GGH4 that performs heat exchange between the condensate and the gas exhausted from the $CO_2$ sorbent packed column 20.

Second Embodiment

Figure 5:
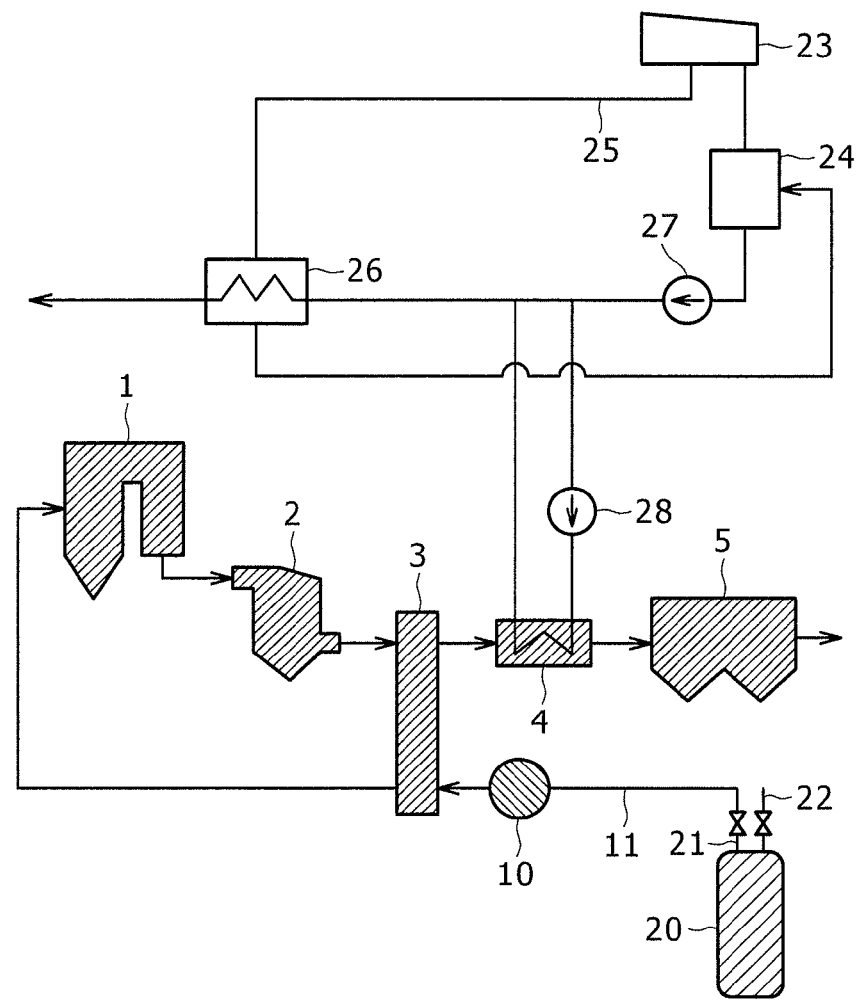
FIG. 5 is a view showing a system for increasing the temperature of a gas flowing into a boiler by using an exhaust gas from the $CO_2$ capture system.

FIG. 5 is a view showing an example of a system using a gas exhausted from a $CO_2$ sorbent packed column 20 as a container for incorporating a $CO_2$ sorbent as a combustion gas of a boiler 1. The system also has a device of performing heat exchange between a condensate condensed by a condenser 24 and a boiler exhaust gas through a heat recovery GGH4.

As the gas flowing into a gas supply blower 10, a gas exhausted from a $CO_2$ sorbent packed column 20 incorporating a $CO_2$ sorbent in the process of a $CO_2$ sorbing step, a $CO_2$ purging step, or a column cooling step can be used. When the temperature of a gas flowing into an air heater 3 is heated from 30° C. to 100° C. by using the gas exhausted from the $CO_2$ sorbent packed column 20, the temperature of the exhaust gas flowing into the heat recovery GGH4 is increased by about 50° C. Accordingly, the temperature of the condensate undergoing heat exchange by the heat recovery GGH4 can be increased effectively to improve the boiler output. In this case, the electric power generation efficiency of the boiler system is improved by about 2.1%.

Further, when the gas exhausted from the $CO_2$ sorbent packed column 20 as a container in the $CO_2$ purging step is used as the gas flowing into the gas supply blower 10, a small amount of $CO_2$ may sometimes be contained in addition to $N_2$ and $O_2$ as the species of the gas exhausted from the $CO_2$ sorbent packed column 20. In this case, since the $CO_2$ gas can be caused to flow again into the boiler in this system, the $CO_2$ gas can be sorbed again by the $CO_2$ capture system by way of the exhaust gas purification system. Accordingly, $CO_2$ capturing efficiency is improved.

In this embodiment, the system is adapted to use the gas exhausted from the $CO_2$ sorbent packed column 20 as the combustion gas for the boiler 1. It is also possible to use atmospheric air as a combustion gas for the boiler 1 after increasing the temperature of the atmospheric air by heat exchange with the gas exhausted from the $CO_2$ sorbent packed column 20. In this case, a gas exhausted from the $CO_2$ sorbent packed column 20 incorporating a $CO_2$ sorbent at any of the $CO_2$ sorbing step, the $CO_2$ purging step, the $CO_2$ desorbing step, and the column cooling step can be used as the gas flowing into the gas supply blower 10.

With the result described above, as shown in this embodiment, the boiler output can be improved in the system of increasing the temperature of the fluid concerned with the boiler system by using the exhaust gas exhausted from the $CO_2$ capture system, in which the temperature of the gas flowing into the boiler is increased using the exhaust gas exhausted from the $CO_2$ capture system, by adapting the system such that the exhaust gas exhausted from the $CO_2$ sorbent packed column 20 partially or entirely comprises the combustion gas flowing to the boiler 1 or by adapting the system, for example, as a heat recovery GGH that performs heat exchange between air and the gas exhausted from the $CO_2$ sorbent packed column 20 to increase the temperature of the air and use the air as the combustion gas of the boiler 1.

Third Embodiment

Figure 6:
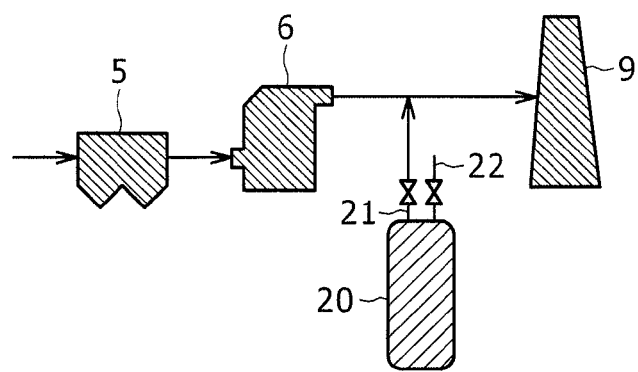
FIG. 6 is a view showing a system for increasing the temperature of a gas flowing into a chimney by using an exhaust gas from the $CO_2$ capture system.

FIG. 6 is a view showing an embodiment of a system of letting a gas exhausted from a $CO_2$ sorbent packed column 20 as a container for incorporating a $CO_2$ sorbent flow into a gas at the upstream of a chimney 9. As the gas flowing into the gas upstream of the chimney 9, a gas exhausted from the $CO_2$ sorbent packed column 20 for incorporating the $CO_2$ sorbent at the $CO_2$ sorbing step, the $CO_2$ purging process, or the column cooling step can be used. Generally, the temperature of a gas exhausted from a desulfurization device 6 is at about 40 to 50° C. and, when the temperature of the gas is increased to about 90° C. by flowing the gas exhausted from the $CO_2$ sorbent packed column 20 for incorporating the $CO_2$ sorbent to the gas at the upstream of the chimney 9, generation of the white smoke from the chimney 9 can be prevented. Further, the boiler output can be improved also by using the system as shown in FIG. 2 together and performing heat exchange between the condensate condensed by the condenser 24 and the boiler exhaust gas in the heat recovery GGH4.

In this embodiment, the system is adapted such that the gas exhausted from the $CO_2$ sorbent packed column 20 as a gas flowing into the gas at the upstream of the chimney 9, the temperature of the gas flowing into the chimney 9. Alternatively, the temperature of the gas flowing into the chimney 9 can be increased also by performing heat exchange between the gas exhausted from the desulfurization device 6 and the gas exhausted from the $CO_2$ sorbent packed column 20. As the gas exhausted from the $CO_2$ sorbent packed column 20, a gas exhausted from the $CO_2$ sorbent packed column 20 incorporating the $CO_2$ sorbent at any of the $CO_2$ sorbing step, the $CO_2$ purging step, the $CO_2$ desorbing step, or the column cooling step can be used.

With the result described above, as shown in this embodiment, the boiler output can be improved and generation of the white smoke from the chimney can be prevented in a system of increasing the temperature of the fluid concerned with a boiler system using the exhaust gas exhausted from the $CO_2$ capture system by adapting the system such that the gas flowing into the chimney 9 contains the gas exhausted from the $CO_2$ sorbent packed column 20, or adapting the system, for example, as a heat recovery GGH of increasing the temperature of a gas flowing into the chimney 9 by heat exchange between the gas exhausted from the desulfurization device 6 and the gas exhausted from the $CO_2$ sorbent packed column 20.

The present invention is not restricted to the embodiments described above but includes various modified embodiments. For example, the embodiments described above have been described specifically for easy explanation of the present invention but are not always restricted to those having all constituent factors described therein. Further, a portion of the constitution of one embodiment can be replaced with the constitution of other embodiments, or a constitution of one embodiment can be added to that of other embodiments. Further, for a portion of a constitution in each of the embodiments, addition, deletion or replacement of other constitution are possible.

What is claimed is:

1. A boiler system comprising:
an electric power generation system including:
a boiler;
a steam turbine which generates electric power by steam heated at the boiler;
a condenser downstream thereof for condensing the steam; and
a heater which heats condensed water by steam extracted from the steam turbine; and further
a $CO_2$ capture system which sorbs and captures a $CO_2$ gas in an exhaust gas exhausted from the boiler by using a solid $CO_2$ sorbent; and
a chimney which exhausts exhaust gas after recovery of $CO_2$ in the $CO_2$ capture system or exhausted from the boiler,
wherein the system has a device for increasing a temperature of fluid for the boiler system by using exhaust gas exhausted from the $CO_2$ capture system,
wherein the device for increasing the temperature of the fluid is a device in which the fluid contains the exhaust gas exhausted from the $CO_2$ capture system, and wherein the fluid for the boiler system is either a gas flowing into the boiler or an exhaust gas flowing into the chimney.

2. The boiler system according to claim 1, wherein the fluid for the boiler system is a gas flowing into the boiler, and the gas flowing into the boiler is further heated by an air heater upstream of the boiler.

3. The boiler system according to claim 1, wherein the fluid is an exhaust gas flowing into the chimney, wherein the exhaust gas exhausted from the $CO_2$ capture system is a gas exhausted during $CO_2$ sorbing, $CO_2$ purging, process or column cooling.

4. The boiler system according to claim 3, wherein the device for increasing the temperature of the fluid is a device at least partially using the exhaust gas exhausted from the $CO_2$ capture system as the gas flowing into the boiler.

5. The boiler system according to claim 1, wherein the device for increasing the temperature of the fluid is a system in which the exhaust gas flowing into the chimney contains the exhaust gas exhausted from the $CO_2$ capture system.

6. The boiler system according to claim 1, wherein the $CO_2$ capture system includes a $CO_2$ sorption column into which at least one of the exhaust gas exhausted from the boiler, the $CO_2$ gas, steam, and air is introduced.

7. The boiler system according to claim 1, wherein the $CO_2$ capture system includes plural $CO_2$ sorption columns arranged so that a gas flowing out of one of the $CO_2$ sorption columns is caused to flow into another of the $CO_2$ sorption columns.

8. The boiler system according to claim 1, wherein a solid $CO_2$ sorbent used for the $CO_2$ capture system contains Ce.

9. The boiler system according to claim 1, wherein the exhaust gas exhausted from the $CO_2$ capture system is a gas exhausted at any of a $CO_2$ capturing step, a $CO_2$ purging step, a $CO_2$ desorbing step, or a column cooling step.

* * * * *